(12) United States Patent
Sakakibara

(10) Patent No.: US 11,787,295 B2
(45) Date of Patent: Oct. 17, 2023

(54) FOREIGN OBJECT DETECTING SYSTEM AND NON-CONTACT CHARGING SYSTEM

(71) Applicant: HONDA MOTOR CO., LTD., Tokyo (JP)

(72) Inventor: Naoya Sakakibara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 17/185,019

(22) Filed: Feb. 25, 2021

(65) Prior Publication Data

US 2021/0276435 A1 Sep. 9, 2021

(30) Foreign Application Priority Data

Mar. 3, 2020 (JP) .................................. 2020-036113

(51) Int. Cl.
*B60L 53/124* (2019.01)

(52) U.S. Cl.
CPC ......... *B60L 53/124* (2019.02); *B60L 2250/16* (2013.01)

(58) Field of Classification Search
CPC ..... B60L 53/124; B60L 2250/16; B60L 53/66
See application file for complete search history.

(56) References Cited

U.S. PATENT DOCUMENTS

| | | | | |
|---|---|---|---|---|
| 9,404,954 | B2* | 8/2016 | Roy | G01R 29/0814 |
| 10,128,697 | B1* | 11/2018 | Anwer | B60L 53/124 |
| 2012/0200151 | A1* | 8/2012 | Obayashi | B60L 50/61 |
| | | | | 307/104 |
| 2015/0162752 | A1 | 6/2015 | Endo | |
| 2021/0281121 | A1* | 9/2021 | Watanabe | B60L 53/124 |
| 2021/0284033 | A1* | 9/2021 | Iwamoto | B60L 53/66 |

FOREIGN PATENT DOCUMENTS

| | | |
|---|---|---|
| JP | 2013-252039 A | 12/2013 |
| JP | 2015-025742 A | 2/2015 |
| JP | 2015-100154 A | 5/2015 |
| JP | 2017-093140 A | 5/2017 |
| WO | 2013/179394 A1 | 12/2013 |

OTHER PUBLICATIONS

Office Action dated Dec. 7, 2021, issued in counterpart JP application No. 2020-036113, with English translation. (10 pages).
Office Action dated Jun. 28, 2022, issued in counterpart JP Application No. 2020-036113, with English Translation. (6 pages).

* cited by examiner

*Primary Examiner* — Richard V Muralidar
(74) *Attorney, Agent, or Firm* — WHDA, LLP

(57) ABSTRACT

A displacement of a foreign object is detected on the basis of a position of the foreign object at each of a starting time and a finishing time of a predetermined period. By delaying the timing for determining the displacement mode of the foreign object by the predetermined period (predetermined time), the timing for providing notification recommending the removal of the foreign object can be delayed. When after it is determined that displacement of the foreign object present around a power transmitting unit is present, the presence of the foreign object is not detected, that is, in a state where it is not necessary to provide the notification recommending that a user remove the foreign object, that notification is omitted.

10 Claims, 3 Drawing Sheets

FOREIGN OBJECT DETECTING SYSTEM AND NON-CONTACT CHARGING SYSTEM

CROSS REFERENCES TO RELATED APPLICATIONS

The present application claims priority under 35 U.S.C. § 119 to Japanese Patent Application No. 2020-036113, filed Mar. 3, 2020, entitled "Foreign Object Detecting System and Non-Contact Charging System." The contents of this application are incorporated herein by reference in their entirety.

TECHNICAL FIELD

The present disclosure relates to a system for detecting the presence of a foreign object around a power transmitting unit at the time of charging an onboard battery in a non-contact manner.

BACKGROUND

A technique for providing notification when a foreign object under a vehicle is detected and for determining whether to notify a user when a foreign object around the vehicle is detected is proposed (see, for example, Japanese Unexamined Patent Application Publication No. 2017-093140).

A technique for detecting the strength of a wave reflected from a foreign object and identifying the type of the foreign object (as a moving object when the amount of its movement is large and as a still object when it is small) is proposed (see, for example, Japanese Unexamined Patent Application Publication No. 2015-025742).

SUMMARY

When the presence of a foreign object around a power transmitting unit placed in a parking space to charge a battery on a parked vehicle in a non-contact manner is detected, a user is notified that the removal of the foreign object is recommended. Thus, there is a possibility that although the removal of the foreign object is no longer required because the foreign object moves away from the power transmitting unit after the notification, the user may be urged to needlessly return to the parking space in response to that notification.

The present application describes, for example, a system capable of reducing the frequency of needlessly providing notification for recommending that a user remove a foreign object present around a power transmitting unit.

One aspect of a foreign object detecting system according to the present application includes a foreign object detecting section, a foreign object displacement detecting section, and a notifying section. The foreign object detecting section is configured to detect that a foreign object is present around a power transmitting unit for transmitting power to a power receiving unit on a vehicle in a non-contact manner to charge a battery on the vehicle. The foreign object displacement detecting section is configured to detect a displacement mode of the foreign object whose presence is detected by the foreign object detecting section. The notifying section is configured to control a mode of notification recommending that a user of the vehicle remove the foreign object by way of an external terminal in accordance with the displacement mode detected by the foreign object displacement detecting section.

According to the foreign object detecting system having the above-described configuration, in accordance with a difference in the displacement mode (the presence or absence of the displacement, the speed of the displacement, or the like) of the foreign object present around the power transmitting unit for charging the battery on the vehicle in a non-contact manner, the mode of notification for recommending that the user remove the foreign object (whether or not to provide the notification, timing for providing the notification, or the like) is differentiated. Hence, the frequency of needlessly providing the notification for recommending that the user remove the foreign object present around the power transmitting unit can be reduced.

In the above-described foreign object detecting system, the foreign object displacement detecting section may preferably be configured to detect the displacement mode of the foreign object on the basis of a position of the foreign object whose presence is detected by the foreign object detecting section at each of a starting time and a finishing time of a predetermined period.

According to the foreign object detecting system having the above-described configuration, the timing for providing the notification in accordance with the displacement mode of the foreign object can be delayed by delaying the timing for determining the displacement mode of the foreign object by the predetermined period. Hence, the frequency of providing the notification for recommending that the user remove the foreign object present around the power transmitting unit and by extension the frequency of needlessly providing the notification can be reduced.

In the above-described foreign object detecting system, when after the foreign object displacement detecting section detects that displacement of the foreign object is present, the foreign object detecting section detects that the foreign object is present, the notification recommending that the user of the vehicle remove the foreign object may preferably be provided, and when after the foreign object displacement detecting section detects that the displacement of the foreign object is present, the foreign object detecting section does not detect that the foreign object is present, the notification recommending that the user of the vehicle remove the foreign object may preferably be omitted.

According to the foreign object detecting system having the above-described configuration, when after it is determined that the displacement of the foreign object present around the power transmitting unit is present, the presence of the foreign object is not detected, that is, in a state where it is not necessary to provide the user with the notification recommending removal of the foreign object, the notification is omitted. Hence, the frequency of needlessly providing the notification recommending that the user remove the foreign object present around the power transmitting unit can be reduced.

In the above-described foreign object detecting system, the foreign object detecting section may preferably include a metal detector including a coil array for detecting the presence of an object containing a metal as a foreign object present on or above the power transmitting unit and a biological detector for detecting the presence of a living body as a foreign object present around the power transmitting unit.

According to the foreign object detecting system having the above-described configuration, foreign objects are distinguished into a metal or an object containing the metal (first foreign object) and a living object (second foreign object), and the accuracy of detecting the presence or absence of a foreign object and its displacement mode can be improved.

One aspect of a non-contact charging system according to the present application includes the foreign object detecting system described above and a charging controller configured to stop the power transmission by the power transmitting unit on condition that the foreign object detecting section has detected that the foreign object is present and configured to resume the power transmission by the power transmitting unit in accordance with the displacement mode of the foreign object detected by the foreign object displacement detecting section.

According to the non-contact charging system having the above-described configuration, when the presence of the foreign object around the power transmitting unit is detected, the power transmission by the power transmitting unit and by extension the charging into the battery on the vehicle are stopped. After that, in accordance with the displacement mode (the presence or absence of the displacement, the speed of the displacement, or the like), the power transmission by the power transmitting unit and by extension the charging into the battery on the vehicle are resumed. Hence, the frequency of needlessly providing the notification for recommending that the user remove the foreign object present around the power transmitting unit can be reduced, and the time required for the charging can be shortened.

BRIEF DESCRIPTION OF THE DRAWINGS

The advantages of the disclosure will become apparent in the following description taken in conjunction with the following drawings.

DESCRIPTION OF THE PREFERRED EMBODIMENTS (Configuration)
(Configuration of Non-Contact Charging System and Foreign Object Detecting System)

Figure 1:
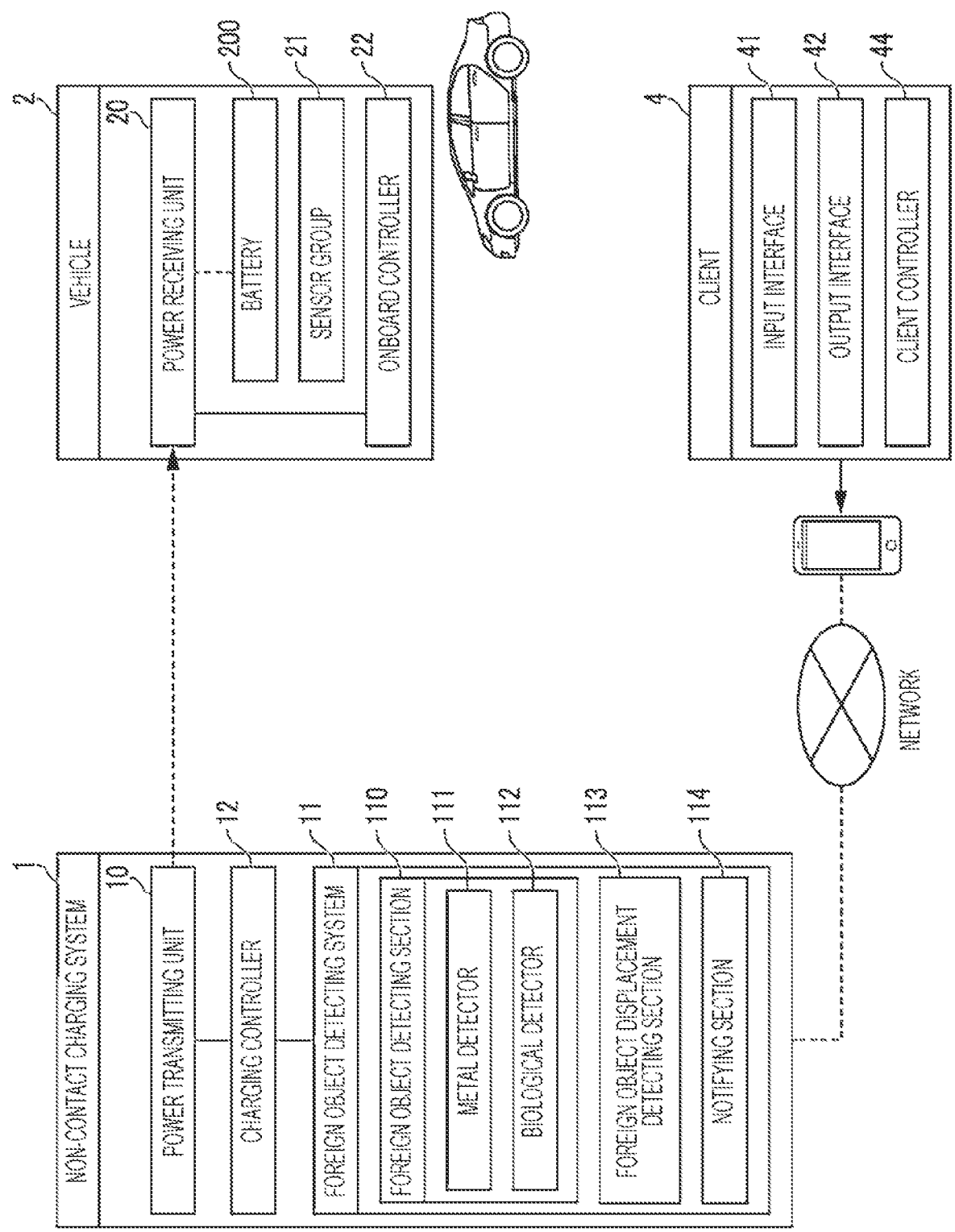
FIG. 1 is a schematic diagram of configuration of a non-contact charging system and a foreign object detecting system included in it as an embodiment of the present application.

A non-contact charging system 1 as an embodiment of the present application illustrated in FIG. 1 includes a power transmitting unit 10, a foreign object detecting system 11, and a charging controller 12. The non-contact charging system 1 has the function of intercommunicating with each of a vehicle 2 and a client 4. The communication scheme used between the non-contact charging system 1 and the vehicle 2 and that between the non-contact charging system 1 and the client 4 may be the same or different.

The power transmitting unit 10 is configured to transmit power to a power receiving unit 20 on the vehicle 2 in a non-contact manner to charge a battery 200 on the vehicle 2. The power transmitting unit 10 may be placed in, for example, a parking space for the vehicle 2.

The foreign object detecting system 11 includes a foreign object detecting section 110, a foreign object displacement detecting section 113, and a notifying section 114.

The foreign object detecting section 110 includes a metal detector 111 and a biological detector 112, which are arranged around or near the power transmitting unit 10.

Figure 2:
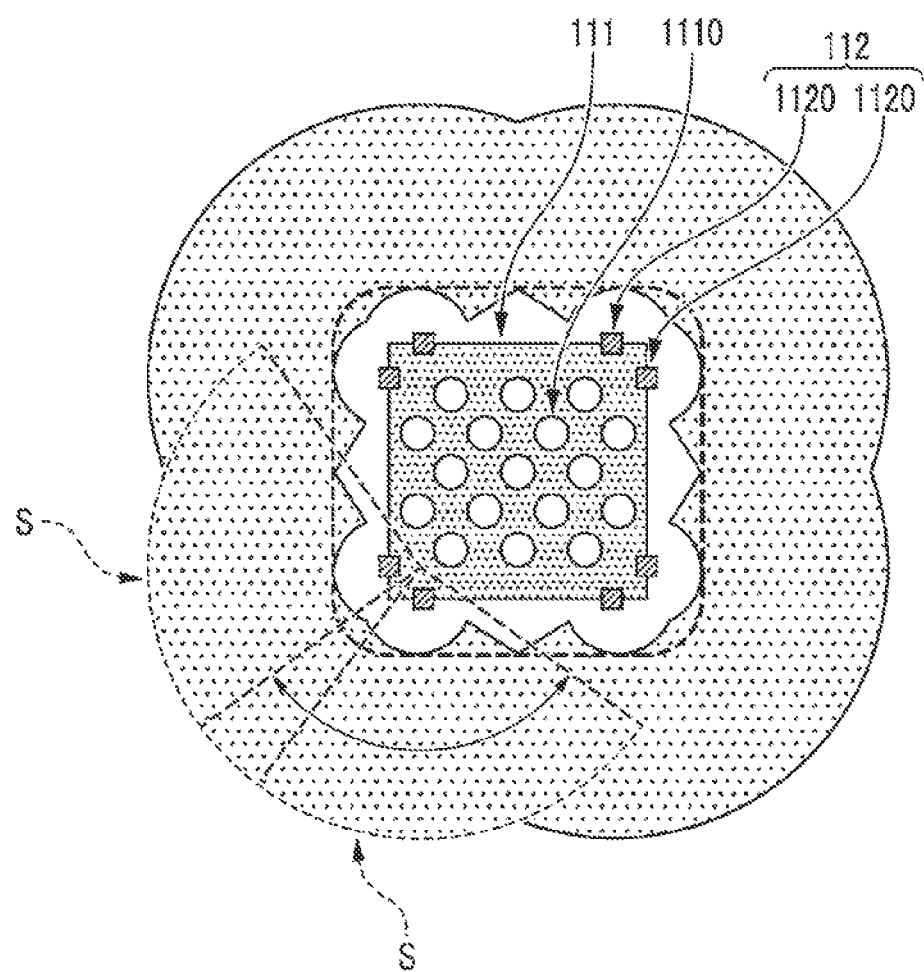
FIG. 2 is a schematic diagram of configuration of a foreign object detecting section.

One example of the metal detector 111 may include a coil array in which a plurality of coils 1110 are distributed over an approximately flat surface and some or all of them are embedded in a resin pad included in the power transmitting unit 10, as illustrated in FIG. 2. The metal detector 111 is configured to detect the presence or absence and the position of a metal on or above the power transmitting unit 10 on the basis of a change mode of an oscillating wave signal supplied to each of the plurality of coils 1110 from an oscillator.

One example of the biological detector 112 may include a plurality of ultrasonic sensors 1120. As illustrated in FIG. 2, the plurality of ultrasonic sensors 1120 are arranged in different locations in an outer edge region of the resin pad included in the power transmitting unit 10. Each of detectable zone S of the biological detector 112 illustrated in FIG. 2 has a three-dimensional shape in which a fan-shaped region is rotated about the axis extending through the biological detector 112. The biological detector 112 is configured to detect the presence or absence and the position of a living body around the power transmitting unit 10 on the basis of a transmission signal from each of the plurality of ultrasonic sensors 1120.

The foreign object displacement detecting section 113 is configured to detect a displacement mode of the foreign object whose presence is detected by the foreign object detecting section 110 around the power transmitting unit 10. The notifying section 114 is configured to notify the user of an estimated time of completion of charging by way of the client 4.

The charging controller 12 is configured to control the power transmitting operation by the power transmitting unit 10. The charging controller 12 includes a storage device (e.g., a hard disk drive (HDD), memory, or a solid-state drive (SSD) including it) and a processor configured to read necessary data and program (software) from that storage device and perform processing on that data in accordance with that program (e.g., central processing unit (CPU), single-core processor, or multicore processor).

(Vehicle Configuration)

The vehicle 2 illustrated in FIG. 1 includes the power receiving unit 20, a sensor group 21, an onboard controller 22, and the battery 200.

The power receiving unit 20 is configured to receive power from the power transmitting unit 10 placed at a designated location in a non-contact manner to charge the battery 200. One example of the battery 200 may include a lithium-ion secondary cell. The onboard controller 22 is configured to control operations of elements of the vehicle 2 as needed in accordance with output signals from various sensors in the sensor group 21.

Like the charging controller 12, the onboard controller 22 includes a storage device (e.g., an HDD, memory, or an SSD including it) and a processor configured to read necessary data and program (software) from that storage device and perform processing on that data in accordance with that program (e.g., CPU, single-core processor, or multicore processor).

(Client Configuration)

The client 4 is a terminal device, such as a smartphone, a tablet terminal, or a personal computer, and includes an input interface 41, an output interface 42, and a client controller 44. The input interface 41 includes a touch-panel button, a switch, or the like. The output interface 42 includes an image output device and wireless communication equipment. The client controller 44 includes a processor (single-core processor, multicore processor, or processor core included therein) and is configured to read necessary data and software from the storage device, such as memory, and perform processing on that data in accordance with that software.

(Functions)

An embodiment of a function of the non-contact charging system 1 having the above-described configuration is described with reference to the flowchart in FIG. 3. The function is activated after the vehicle 2 is parked in a position in a parking space where power can be transmitted from the power transmitting unit 10 to the power receiving unit 20, communication between the non-contact charging system 1 and the vehicle 2 is established, and the transmission of power from the power transmitting unit 10 to the power receiving unit 20 starts.

Figure 3:
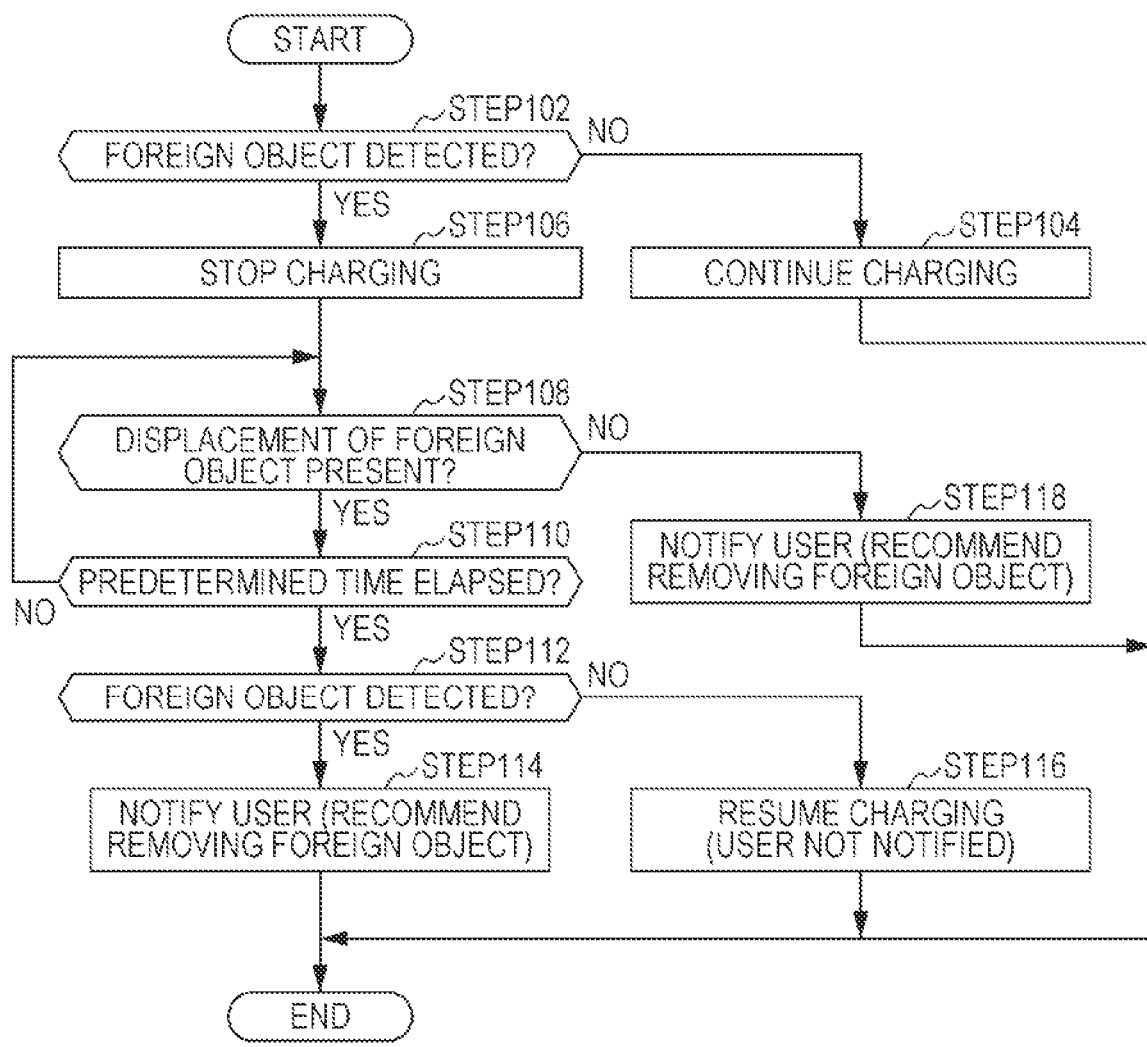
FIG. 3 is a schematic diagram of a function of the non-contact charging system and the foreign object detecting system included in it as an embodiment of the present application.

First, it is determined whether the foreign object detecting section 110 has detected the presence of a foreign object (Step 102 in FIG. 3). Specifically, it is determined whether the presence of a metal or an object containing the metal (first foreign object) on or above or near the power transmitting unit 10 has been detected by way of the metal detector 111 and whether the presence of a living body (second foreign object), such as a hand or foot of a human, around the power transmitting unit 10 by way of the biological detector 112.

When it is determined that the presence of the foreign object has not been detected (No at Step 102 in FIG. 3), the charging controller 12 causes the power transmission by the power transmitting unit 10 to continue, and by extension the non-contact charging into the battery 200 on the vehicle 2 to continue (Step 104 in FIG. 3). Then, the determination whether the presence of the foreign object has been detected (Step 102 in FIG. 3) and its subsequent process repeat.

When it is determined that the presence of the foreign object has been detected (Yes at Step 102 in FIG. 3), the charging controller 12 causes the power transmission by the power transmitting unit 10 to stop, and by extension the non-contact charging into the battery 200 on the vehicle 2 to stop (Step 106 in FIG. 3).

Subsequently, the foreign object displacement detecting section 113 determines whether displacement of the foreign object whose presence has been detected by the foreign object detecting section 110 is absent or present (the speed of displacement is zero or not) as a displacement mode of the foreign object (Step 108 in FIG. 3).

When it is determined that the displacement of the foreign object is absent (No at Step 108 in FIG. 3), the notifying section 114 sends notification that recommends removing the foreign object to the client 4 (Step 118 in FIG. 3). In response to it, that notification is output to the output interface 42 in the client 4. The notifying section 114 may send the notification that recommends removing the foreign object to the client 4 on condition that for a first predetermined time, the foreign object detecting section 110 continuously detects the presence of the foreign object and the foreign object displacement detecting section 113 continuously detects the absence of the displacement of the foreign object.

When it is determined that the displacement of the foreign object is present (Yes at Step 108 in FIG. 3), it is determined whether a predetermined time (a second predetermined time the same as or different from the first predetermined time) has elapsed (Step 110 in FIG. 3).

When it is determined that the predetermined time has not elapsed, that is, when it is determined that the present time has not reach the finishing time of the predetermined period (No at Step 110 in FIG. 3), the determination whether the displacement of the foreign object is present or absent by the foreign object displacement detecting section 113 repeats (Step 108 in FIG. 3).

When it is determined that the predetermined time has elapsed, that is, when it is determined that the present time reached the finishing time of the predetermined period while the foreign object displacement detecting section 113 was detecting the presence of the displacement of the foreign object (Yes at Step 110 in FIG. 3), it is determined whether the foreign object detecting section 110 has detected the presence of the foreign object (Step 112 in FIG. 3).

When it is determined that the presence of the foreign object has been detected (Yes at Step 112 in FIG. 3), the notifying section 114 sends notification that recommends removing the foreign object to the client 4 (Step 114 in FIG. 3). In response to this, that notification is output to the output interface 42 in the client 4.

When it is determined that the presence of the foreign object has not been detected (No at Step 112 in FIG. 3), the charging controller 12 causes the power transmission by the power transmitting unit 10 to resume, and by extension the non-contact charging into the battery 200 on the vehicle 2 to resume (Step 116 in FIG. 3). At that time, the transmission of the notification that recommends removing the foreign object to the client 4 is omitted. That is, in that case, the notification is not output to the output interface 42 in the client 4.

(Operational Advantages)

According to the non-contact charging system 1 having the above-described configuration, when the presence of the foreign object is detected around the power transmitting unit 10, the power transmission by the power transmitting unit 10, and by extension the charging into the battery 200 on the vehicle 2 are stopped (see Yes at Step 102 to Step 106 in FIG. 3). After that, in repose to the determination that the displacement of the foreign object is present for the predetermined period, the power transmission by the power transmitting unit 10 and by extension the charging into the battery 200 on the vehicle 2 are resumed (see Yes at Step 110 to No at Step 112 to Step 116 in FIG. 3). In that way, the time required for charging the battery 200 can be shortened.

According to the foreign object detecting system 11 included in the non-contact charging system 1 having the above-described configuration, in accordance with the displacement mode of the foreign object present around the power transmitting unit 10, the mode of notification for recommending removal of the foreign object to the user (whether or not to provide the notification, timing for providing the notification, or the like) is differentiated (see Yes at Step 108 to . . . to Step 114 or Step 116, No at Step 108 to Step 118).

For example, the displacement mode of the foreign object is detected on the basis of the positions of the foreign object at the starting time and the finishing time of the predetermined period (see Step 108 in FIG. 3). By delaying the timing for determining the displacement mode of the foreign object by the predetermined period (predetermined time), the timing for providing notification that recommends removing the foreign object can be delayed (see Yes at Step 110 to . . . to Step 114).

When after it is determined that the displacement of the foreign object present around the power transmitting unit is present, the presence of the foreign object is not detected, that is, in a state where it is not necessary to provide the user with the notification recommending removal of the foreign object, the notification is omitted (see Yes at Step 108 to . . . to No at Step 112 to Step 116). Hence, the frequency of needlessly providing the notification for recommending the removal of the foreign object present around the power transmitting unit 10 can be shortened.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A foreign object detecting system comprising:
    a foreign object detecting section configured to detect that a foreign object is present around a power transmitting unit transmitting power to a power receiving unit of a vehicle in a non-contact manner to charge a battery of the vehicle;
    a foreign object displacement detecting section configured to detect a displacement mode of the foreign object whose presence is detected by the foreign object detecting section; and
    a notifying section configured to control a mode of notification to a user of the vehicle via an external terminal in accordance with the displacement mode detected by the foreign object displacement detecting section, the notification recommending that the user of the vehicle remove the foreign object,
    wherein the foreign object displacement detecting section detects the displacement mode of the foreign object by determining whether speed of displacement of the foreign object is zero or not, detects the displacement of the foreign object in a case when the speed of displacement of the foreign object is not zero, and not detect the displacement of the foreign object in a case when the speed of displacement of the foreign object is zero,
    wherein the foreign object displacement detecting section determines whether a predetermined time has elapsed while detecting the speed of displacement of the foreign object is not zero, and
    in a case when it is determined that the speed of displacement of the foreign object is zero before the predetermined time has elapsed, the notifying section provides the notification to the user.

2. The foreign object detecting system according to claim 1, wherein the foreign object displacement detecting section is configured to detect the displacement mode of the foreign object on the basis of a position of the foreign object whose presence is detected by the foreign object detecting section at each of a starting time and a finishing time of a predetermined period.

3. The foreign object detecting system according to claim 2, wherein when the foreign object detecting section still detects that the foreign object is present after the foreign object displacement detecting section detects presence of displacement of the foreign object, the notifying section provides the notification recommending that the user of the vehicle remove the foreign object, and
    when the foreign object detecting section does not detect that the foreign object is present after the foreign object displacement detecting section detects presence of the displacement of the foreign object, the notifying section omits transmission of the notification recommending that the user of the vehicle remove the foreign object.

4. The foreign object detecting system according to claim 1, wherein the foreign object detecting section includes
    a metal detector including a coil array detecting the presence of an object containing a metal as a foreign object present on or above the power transmitting unit, and
    a biological detector detecting the presence of a living body as a foreign object present around the power transmitting unit.

5. A non-contact charging system comprising:
    the foreign object detecting system according to claim 1; and
    a charging controller configured to stop the power transmission by the power transmitting unit on condition that the foreign object detecting section has detected that the foreign object is present and configured to resume the power transmission by the power transmitting unit in accordance with the displacement mode of the foreign object detected by the foreign object displacement detecting section.

6. The foreign object detecting system according to claim 1, wherein the mode of notification includes whether or not to provide the notification, or timing for providing the notification.

7. The foreign object detecting system according to claim 1, wherein the foreign object displacement detecting section is configured to detect the displacement mode by detecting a displacement state of the foreign object by using a sensor.

8. The foreign object detecting system according to claim 1, wherein when the foreign object detecting section detects that the foreign object is present, the foreign object detecting section detects presence of displacement of the foreign object over a predetermined period of time, and
    when the presence of displacement of the foreign object disappears before elapse of the predetermined time, the notifying section provides the notification recommending that the user of the vehicle remove the foreign object.

9. A foreign object detecting method comprising steps of:
    (i) detecting, by using a computer, that a foreign object is present around a power transmitting unit transmitting power to a power receiving unit of a vehicle in a non-contact manner to charge a battery of the vehicle;
    (ii) detecting, by using a computer, a displacement mode of the foreign object whose presence is detected; and
    (iii) controlling, by using a computer, a mode of notification to a user of the vehicle via an external terminal in accordance with the detected displacement mode, the notification recommending that the user of the vehicle remove the foreign object,
    wherein the step (ii) further comprises detecting the displacement mode of the foreign object by determining whether speed of displacement of the foreign object is zero or not, detecting the displacement of the foreign object in a case when the speed of displacement of the foreign object is not zero, and not detecting the displacement of the foreign object in a case when the speed of displacement of the foreign object is zero, the step (ii) further comprise determining whether a predetermined time has elapsed while detecting the speed of displacement of the foreign object is not zero, and in a case when it is determined that the speed of displacement of the foreign object is zero before the predetermined time has elapsed, the step (iii) provides the notification to the user.

10. The foreign object detecting system according to claim 1, wherein in a case when it is determined that the predetermined time has elapsed while detecting the speed of displacement of the foreign object is not zero, it is determined whether the foreign object is present or not, in a case when it is determined that the foreign object is present, the notifying section provides the notification to the user, in a case when it is determined that the foreign object is not present, power transmission is enabled.

* * * * *